United States Patent Office 3,407,060
Patented Oct. 22, 1968

3,407,060
PROCESS FOR PRODUCING ZINC IN A BLAST FURNACE UTILIZING OXYGEN ENRICHED AIR
John Lumsden, Avonmouth, England, assignor to Metallurgical Processes Limited, Nassau, Bahamas, a corporation of the Bahamas, and Imperial Smelting Corporation (N.S.C.) Limited, London, England, a British company doing business as Metallurgical Development Company, doing business together at Nassau, Bahamas
No Drawing. Filed Sept. 15, 1964, Ser. No. 396,756
Claims priority, application Great Britain, Sept. 30, 1963, 38,331/63
11 Claims. (Cl. 75—87)

ABSTRACT OF THE DISCLOSURE

A special carefully regulated and controlled blast of preheated oxygen-enriched air is blown into the bottom of a continuous column of oxidic zinc and coke charge materials in a zinc blast furnace to establish and maintain therein a zone of chemical and thermal equilibrium where gas and charge are at substantially the same temperature with the gas in equilibrium with oxidic zinc in the charge, but at an equilibrium temperature higher than that obtained when using a conventional blast of normal preheated air, to increase the throughput of the furnace and to reduce the ratio of coke consumed to zinc produced compared with customary practice in which a normal blast of preheated air only is blown into the bottom of the furnace.

---

This invention relates to zinc-producing blast furnaces. Objects of the invention are to increase the throughput of such blast furnaces and to reduce the ratio of coke consumed to zinc produced, compared with the prior art in which preheated atmospheric air is used as the blast.

In a zinc-producing blast furnace as customarily operated, the charge consists of oxidised zinciferous material and coke. The coke is usually preheated to 700–900° C. The zinciferous portion of the charge is sometimes similarly preheated and is sometimes introduced cold or preheated to a lower temperature. Lead-containing materials are sometimes incorporated in the zinciferous charge. Lime, and sometimes other slag-forming components, are incorporated with the zinciferous charge in order to ensure that a molten slag, of low zinc content, tapped from the bottom of the furnace, is of suitable composition. If lead is present in any large amount in the charge, it is likewise tapped from the furnace hearth. The zinc in the charge is reduced and volatilised as zinc vapour, which is conducted to a condenser, where it is brought into shock-chilling contact with molten lead. Air, usually preheated to 500–700° C., is introduced through tuyeres near the bottom of the furnace.

In a zinc-producing blast furnace, the gas leaving the furnace charge contains as its main components zinc vapour, nitrogen, carbon monoxide and carbon dioxide, the carbon dioxide and zinc vapour usually being present in comparable volume concentrations. Particularly when the zinciferous portion of the charge is introduced cold, it is found necessary to raise the temperature of the gas by introducing some air above the furnace charge to burn some of the carbon monoxide in the gas, thereby further increasing the concentration of carbon dioxide. In a zinc blast furnace, the reduction of the zinc oxide is thus carried out under less highly reducing conditions than in a retort, and this explains why the iron present in the charge to a zinc blast furnace is carried off in oxidised form in the slag, while in retort smelting, which produces a gas consisting mainly of approximately equal volumes of carbon monoxide and zinc vapour, practically all the iron present is reduced to metal.

Although the reactions taking place in the various zones of a zinc blast furnace must be very complex, the approximate equality between the volume concentrations of zinc and carbon dioxide generated indicates that the main reactions are combustion of carbon to carbon monoxide near the bottom of the furnace (Equation 1), followed by reduction of zinc oxide by carbon monoxide higher up in the furnace (Equation 2).

$$C + \tfrac{1}{2} O_2 = CO \tag{1}$$

$$ZnO + CO = Zn(gas) + CO_2 \tag{2}$$

Two other reactions can occur to some extent. Firstly, at the furnace bottom some of the carbon may burn to carbon dioxide:

$$C + O_2 = CO_2 \tag{3}$$

Secondly, higher up in the furnace some of the carbon dioxide formed by reaction 2 can react with carbon to regenerate carbon monoxide:

$$CO_2 + C = 2CO \tag{4}$$

The zinc-generating reaction 2 absorbs a large amount of heat, which, together with the sensible heat of the gases, has to be supplied by combustion of carbon. Reaction 3 generates much more heat than reaction 1. From the point of view of the heat balance, therefore, in order to improve the fuel economy, that is, to reduce the ratio of carbon required to zinc produced, it is desirable to have as large as possible a $CO_2/CO$ ratio.

Reaction 2 is reversible. Its equilibrium constant $K$ can be written:

$$K = (\text{percent Zn}) \times \left( \frac{\text{percent } CO_2}{\text{percent } CO} \right) \tag{5}$$

Expression 5 means that $K$ is equal to the percentage by volume of zinc multiplied by the volume of ratio of $CO_2$ to $CO$ in the gas. At 1000° C., for example, $K=3$, which would be satisfied if the gas contained 6% Zn and a $CO_2/CO$ ratio of 0.5, or 10% Zn and a $CO_2/CO$ ratio of 0.3. At 1050° C., $K=6$, which would be satisfied if the gas contained 12% Zn and a $CO_2/CO$ ratio of 0.5 or 20% Zn and a $CO_2/CO$ ratio of 0.3.

In order to generate a gas of any given composition by reduction of zinc oxide by reaction 2, it is necessary that the temperature should be at least equal to that for equilibrium for the gas composition hereinafter referred to as the equilibrium temperature. With a given $CO_2/CO$ ratio in the gas, the higher the zinc concentration, the higher is the equilibrium temperature. In a zinc blast furnace, as hitherto operated with air of atmospheric composition as blast, the diluent nitrogen enables zinc reduction to be effected with the production of a gas with a $CO_2/CO$ ratio of 0.3 or above without the temperature generated near the top of the furnace being much above 1000° C. Insofar as the $CO_2/CO$ ratio can be maintained constant, using oxygen-enriched air should enable more heat to be made available for zinc reduction per unit of carbon consumed, because less nitrogen has to be heated up in the furnace. With oxygen-enriched air, however, with a constant $CO_2/CO$ ratio and a constant Zn/C ratio, the concentration of zinc in the gas increases, and if the Zn/C ratio is increased the concentration of zinc in the gas increases still further. With oxygen-enriched blast, therefore, the value of $K$ (Equation 5) increases and therefore the temperature that has to be attained near the top of the furnace increases.

Apart from other difficulties arising from too high a temperature near the top of the furnace, increasing the temperature greatly increases the rate of reaction of carbon dioxide with carbon (reaction 4). If the temperature rises too high, this reaction, which at lower temperature is slow, proceeds at a rate such that an appreciable fraction of the carbon dioxide generated by the reduction of zinc oxide (reaction 2) is reduced to CO so that the $CO_2/CO$ ratio falls. This fall in $CO_2/CO$ means that less heat is available per unit weight of carbon consumed and this effect would mean that the Zn/C ratio in the charge would have to be reduced. Further, a reduction of $CO_2/CO$ ratio might lead to reduction of iron oxide to iron metal, with consequent operating difficulties.

We have now discovered that, within certain limits, an oxygen-enriched blast gives greatly improved throughput and increase of zinc production per unit of coke consumed, while still giving good zinc recovery.

The invention consists in a method of operating a zinc-producing blast furnace comprising the steps of charging coke and sintered zinciferous materials and introducing a blast of preheated air at the bottom of the furnace and maintaining a zone of chemical and thermal equilibrium in the furnace in which oxygen-enriched air is used for the blast and the amount of oxygen enrichment is adjusted so as to be sufficient to increase the equilibrium temperature to between 1040° C. and 1060° C. under the prevailing conditions.

Conditions of operation with normal air blast

Although the reactions taking place inside a zinc smelting blast furnace must be very complex, the principles underlying the present invention can be explained by considering only the most important reactions. A first convenient simplifying assumption is that the carbon all initially burns to carbon monoxide according to reaction 1 and then some of this carbon monoxide is used to reduce the zinc oxide by reaction 2. This means ignoring the relatively small amounts of carbon dioxide produced near the furnace bottom by reaction 3 and destroyed higher up the furnace by reaction 4.

If the only reactions taking place are those represented by reactions 1 and 2 and atmospheric air is the source of oxygen, the reactions taking place can be represented as

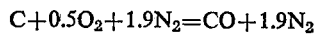

followed by

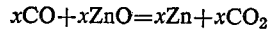

The final gas will then contain, per mole of carbon burnt,

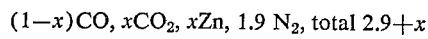

If $x=0.30$, the gas would contain 0.7 CO, 0.3 $CO_2$, 0.3 Zn, 1.9 $N_2$, total 3.2 or 9.4% Zn, 9.4% $CO_2$, 21.9% CO, 59.3% $N_2$. For such a gas the equilibrium constant K is $$K = 9.4 \times \frac{9.4}{21.9} = 4.0$$

Since reaction 2 is intrinsically fast, with good contact between gases and charge, there is a zone in the furnace where gas and charge are at substantially the same temperature, with the gas in equilibrium with the zinc oxide in the charge. Thus, in the example, with $x=0.30$, this temperature is 1020° C. If the charge were preheated to 1020° C. before being introduced into the furnace, this zone of chemical and thermal equilibrium would extend to the top of the furnace. If the charge is less highly preheated, this zone is lower down in the furnace but still extends to relatively near the furnace top. The heat balance can be considered for the portion of this furnace below the equilibrium zone.

The sources of heat are the sensible heat introduced with the air blast (at say 700° C.) and with the charge (at 1020° C.), together with the heat generated by reaction 1. The heat demands are the sensible heat of the gases (at 1020° C.) and the heat content of the molten slag, together with the heat required for the zinc reduction by reaction 2, and the heat losses. In considering the heat balance, it is convenient to take a reference temperature of 1020° C. At this temperature the heat generated in reaction 1 is 27.2 Kcals. per mole of carbon burnt. To obtain the heat available at 1020° C. must be subtracted the heat required for raising the temperature of the air blast from its initial temperature, say 700° C., to 1020° C.

|  | Kcals. |
|---|---|
| $0.5O_2$ from 700° C. to 1020° C. | 1.3 |
| $1.9N_2$ from 700° C. to 1020° C. | 4.8 |
|  | 6.1 |

Heat available at 1020° C., 27.2−6.1=21.1 Kcals. per mole of carbon.

In reaction 2 the heat absorbed is 44 Kcals. per mole of zinc oxide reduced.

It is convenient to allocate the other items in the heat balance as proportional to either the carbon or the zinc in the charge. The heat losses tend to be proportional to the amount of carbon consumed and the amount of slag produced is chiefly determined by the amount of gangue introduced with the zinc oxide and is therefore proportional to the zinc in the charge. If, for example, the heat losses are equal to 4.6 Kcals. per mole of carbon burnt, the net heat available becomes 21.1−4.6=16.5 Kcals. per mole of carbon If the heat required for slag melting is 11 Kcals. per mole of zinc oxide reduced (i.e. the amount of slag produced is about 0.9 of the total zinc charged), the total heat requirements per mole of zinc reduced becomes 44+11=55 Kcals. per mole of zinc Hence is calculated that for one mole of carbon burnt, 16.5/55=0.30 mole of zinc can be reduced. This represents the ratio of zinc reduced to carbon consumed in the whole furnace operation only if the charge introduced into the furnace is preheated to 1020° C.

Zinc blast furnaces can be used to smelt mixed zinc-lead materials, lead being tapped from the furnace hearth. When the charge contains a large amount of lead, it is found necessary to charge the sinter cold, although the coke may be preheated, in order to prevent volatilisation of lead sulphide. In the absence of any large amount of lead, the whole charge may be highly preheated, say to 800° C.

If the coke is highly preheated but the zinciferous sinter is charged cold or only slightly preheated, the charge becomes heated up to 1020° C. partly at the expense of the sensible heat of the gas and partly at the expense of the heat generated on the surface of the charge by oxidation of some of the zinc vapour according to the reverse of Equation 1:

It is estimated that, with a typical charge, if the coke and sinter are both preheated to 800° C., 14% of the zinc vapour is oxidised in this way, and that, if the coke is preheated to 800° C. but the sinter introduced cold, 25% of the zinc vapour is oxidised. That is to say, with the whole charge preheated to 800° C., the 0.300 mole of zinc oxide reduced per mole of carbon would consist of 0.258 mole of zinc oxide charged and 0.042 mole of re-oxidised zinc. Per mole of carbon there would be 0.258 mole of zinc actually leaving the furnace, this representing 1.41 tons of zinc for one ton of carbon consumed; with 5% of the zinc left in the slag, this would represent 1.48 tons of zinc charged for one ton of carbon. If the sinter were charged cold and the coke at 800° C. per mole of carbon charged, there would be 0.225 mole of zinc vapour leaving the furnace, this corresponding to 1.23 tons zinc per ton of carbon; with 5% of the zinc left in the slag, this corresponds to 1.29 tons zinc charged per ton of carbon.

CONDITIONS OF OPERATION WITH OXYGEN ENRICHED BLAST (a) *High grade materials.*—By high grade materials is meant materials for which the weight of slag-forming materials in the charge (or weight of slag produced) is not more than 1.5 times the weight of zinc charged in the oxidised zinciferous material.

Thus amount of heat available from one mole of carbon burnet is increased if less nitrogen is associated with the oxygen. Thus, with a ratio of slag formed to zinc charged of about 0.9 as in the example using normal air blast, if the blast heated to 700° C. contains 28.6% by volume of oxygen, it is calculated that 0.320 mole of zinc are present at 1050° C. for one mole of carbon produced, the gas here having the composition 12.5% Zn, 12.5% $CO_2$, 26.4% CO, 49.6% $N_2$ The K value for this gas is 6.0, corresponding to an equilibrium temperature of 1050° C.

If the blast were further enriched in oxygen, this K value would increase further. We find that satisfactory operation can be attained only if this K value is not above about 6.0; this upper critical limit for K varies slightly with conditions, but generally lies between 5.0 and 7.0, which corresponds to equilibrium temperatures lying between 1040° C. and 1060° C. approximately.

Thus in the example just considered, the useful limit of oxygen enrichment is attained when the blast contains about 28.6% oxygen. This limit depends on conditions; in particular, it depends greatly on the blast temperature. Thus, if the blast is heated only to 500° C., the heat required for heating the gas up to 1050° C. is such that the oxygen concentration of the blast can be increased up to 37%, when a gas is obtained of composition:

13.9% Zn, 13.9% $CO_2$, 32.6% CO, 39.6% $N_2$

This represents a molar Zn/C ratio of 0.300, compared with 0.320 when the blast, containing 28.6% oxygen, is preheated to 700° C. Even with a much higher oxygen enrichment, using a blast at 500° C. instead of 700° C. means that the zinc/carbon ratio is less by about 6%. It is therefor preferable on the economics of fuel consumption to use a highly preheated blast of oxygen-enriched air and a preheat temperature of 700° C. is taken as typical.

There are many variables in the conditions of operation of a zinc-producing blast furnace. To illustrate the principles of the present invention, it is necessary to idealise the problem somewhat. One variable that must be taken into consideration is the ratio of slag-forming materials to zinc in the charge. The heat required for heating the slag-forming materials from 1050° C. and melting to form a liquid slag is estimated to be 0.19 Kcals. for each gram of slag. Another variable already mentioned is that the upper critical value of K may lie between 5.0 and 7.0. It is assumed that the blast temperature is 700° C. It is estimated that heating the blast from 700° C. to 1050° C. absorbs 2.9 Kcals. per mole of oxygen and 2.8 Kcals. per mole of nitrogen. Calculations are made firstly on the assumption that the charge enters the furnace at 1950° C.

Considering now a zinc-rich sinter in which the slag weight is only 0.5 times the weight of zinc volatilised. For one mole (65.4 grammes) of zinc volatilised, the weight of slag is then 32.7 gram., requiring $$0.19 \times 32.7 = 6.2$$

Kcals. With the heat absorbed in reaction 1 taken as 44.0 Kcals., the heat requirements per mole of zinc volatilised become $$44.0 + 6.2 = 50.2 \text{ Kcals.}$$

With a K value of 5.0, the heat balance is satisfied when the blast contains 22.1% oxygen by volume (3.52 $O_2$ to 1.00 $N_2$) and 0.323 mole of zinc are volatilised per mole of carbon consumed, the gas produced containing 10.5% Zn, 10.5% $CO_2$, 22.0% CO, 57% $N_2$.

$$K = \frac{10.5 \times 10.5}{22.0} = 5.0$$

The heat balance is as follows, for one mole of carbon.

| | Kcals. |
|---|---|
| Heating 0.50 mole $O_2$ | 1.45 |
| Heating 1.76 moles $N_2$ | 4.93 |
| Heat loss | 4.60 |
| Zinc reduction 0.323×50.2 | 16.21 |
| Total heat consumed | 27.19 |

Heat from combustion of one mole of carbon to carbon monoxide=27.2 Kcals.

With a K value of 7.0, the heat balance is satisfied when the blast contains 27.6% $O_2$ ($N_2/O_2$ ratio 2.62) and 0.348 mole of zinc are volatilised per mole of carbon consumed, the gas produced containing 13.1% Zn, 13.1% $CO_2$, 24.5% CO, 49.3% $N_2$.

With $K=6$, by interpolation the useful limit of oxygen enrichment is 24.8%.

Thus for high grade charges mean useful limits of oxygen enrichment for the slag to zinc charge ratios of 0.5 to 1.5 with blast preheat of 700° C. and $K=6$ are approximately 24% to 36% and with blast heat 500° C. would be 31% to 44% approximately.

Such calculations as these enable the desirable degree of oxygen enrichment and the appropriate zinc-carbon ratio to be calculated for charges with various ratios of zinc to slag, these calculations applying on the assumption that the charge is preheated to 1050° C. before entering the furnace. In calculating for actual cases, allowance must be made for actual blast preheat temperature and the zinc vapour that is reoxidised in the top of the furnace where the charge becomes heated to 1050° C.

(b) *Low grade materials.*—The higher the slag/zinc ratio, the higher is the oxygen content of the blast that can usefully be employed. For example, if the zinciferous material being treated is the slag from a lead blast furnace, containing about 17% zinc, a typical suitable oxygen content of blast is 45% ($N_2/O_2$ ratio 1.18). The highest oxygen blast that is found to be practical with such low grade materials is 50% ($N_2/O_2$ ratio 1.00). To obtain good operating conditions, the carbon/zinc ratio must be adjusted suitably. Too high a carbon/zinc ratio can cause the furnace to become inoperable because of production of metallic iron. The appropriate carbon/zinc ratio depends on a number of factors, including the temperature to which the charge and blast are preheated. It is always preferable to use a highly preheated blast and a blast temperature of 700° C. is typical. Whether it is preferable to preheat the charge depends on circumstances.

Thus for low grade materials that is to say giving slag to zinc charged ratios of greater than 1.5 the blast usefully contains 36% to 50% oxygen by volume.

(c) *Fuel consumption.*—For all types of charges the fuel consumption can be expressed by the following:

When the whole charge is highly preheated, the carbon charged should be at least equal to the sum of 0.47 times the weight of zinc charged and 0.08 times the weight of slag produced, but should not be greater than the sum of 0.56 times the weight of zinc charged and 0.09 times the weight of slag produced.

When the coke is highly preheated but the sinter is charged cold, the carbon charged should be at least equal to the sum of 0.53 times the weight of zinc charged and 0.14 times the weight of slag produced, but should not be greater than the sum of 0.64 times the weight of zinc charged and 0.15 times the weight of slag produced.

I claim:

1. In the method of operating a zinc-producing blast furnace wherein a charge of carbonaceous reducing agent and oxidic zinciferous material is introduced into the top of the furnace to provide a continuous column therein; a blast of normal preheated air is blown into the bottom of the furnace; carbon monoxide gas is formed by reaction of the carbon with oxygen in the blast of air; oxidic zinc, and other oxidic metals present in the charge, is reduced by the carbon monoxide, and the resulting zinc is volatilized; a zone of chemical and thermal equilibrium is produced and maintained in the column, where gas and charge are at substantially the same temperature; the volume concentrations of zinc vapour and carbon dioxide are substantially equal; and the oxidic zinc in the equilibrium zone is in chemical equilibrium with the gases with respect to the reduction reaction:

$$ZnO + CO \rightleftharpoons Zn(gas) + CO_2$$

a gaseous mixture containing zinc vapour, carbon monoxide, carbon dioxide and nitrogen is formed during the reduction reaction and is withdrawn from a higher part of the furnace for separate recovery of the zinc; and resulting molten slag is withdrawn from the bottom of the furnace; the improvement in combination therewith which comprises:

(a) a special blast of preheated oxygen-enriched air, instead of the conventional blast of normal preheated air, is blown into the bottom of the furnace to produce and maintain such an equilibrium zone at a temperature substantially higher than that obtained with such normal preheated air;

(b) the oxygen content of the special blast of air is carefully regulated and controlled substantially: (1) to increase the temperature at the top of the column in the furnace to make more heat available for zinc oxide reduction per unit of carbon consumed, (2) to increase the concentration of zinc vapour in the furnace gases, (3) to increase the throughput of the charge through the furnace; and (4) to reduce the ratio of carbon consumed to the amount of zinc vapour produced, compared with customary practice;

(c) substantially equal volume concentrations of carbon dioxide gas and zinc vapour are produced and maintained in the furnace gases in the equilibrium zone with the preheated oxygen-enriched air; and (d) the temperature rise in the equilibrium zone is kept below the point at which an appreciable fraction of the carbon dioxide is reduced to prevent a fall in the ratio of carbon dioxide to carbon monoxide and hence a reduction in heat available per unit weight of carbon consumed and to inhibit reduction of any iron oxide that may be present in the charge.

2. A method as claimed in claim 1, in which the oxygen-enriched blast contains 24% to 50% of oxygen by volume.

3. A method as claimed in claim 1, in which the weight of slag-forming materials in the charge is between 0.5 and 1.5 times the weight of zinc charged as oxidized zinciferous material; and the oxygen-enriched blast contains between 24% and 44% of oxygen by volume.

4. A method as claimed in claim 3, in which the blast preheat temperature is about 700° C. and the oxygen-enriched blast contains 24% to 36% of oxygen by volume.

5. A method as claimed in claim 3, in which the blast preheat temperature is about 500° C. and the oxygen-enriched blast contains 31% to 44% of oxygen by volume.

6. A method as claimed in claim 1, in which the weight of slag-forming materials in the charge is greater than 1.5 times the weight of zinc charged as oxidized zinciferous material; the blast is preheated to about 700° C.; and the amount of oxygen in the blast is between 36% and 50% by volume.

7. A method as claimed in claim 1, in which the charge contains a highly preheated carbon, sintered zinciferous and plumbiferous materials; the carbon charged is at least equal to the sum of 0.47 times the weight of zinc charged and 0.08 times the weight of slag produced, but is not greater than the sum of 0.56 times the weight of zinc charged and 0.09 times the weight of slag produced.

8. A method as claimed in claim 1, in which the carbon is highly preheated and sintered zinciferous and plumbiferous materials are charged cold; the carbon charged is at least equal to the sum of 0.53 times the weight of zinc charged and 0.14 times the weight of slag produced, but is not greater than the sum of 0.64 times the weight of zinc charged and 0.15 times the weight of slag produced.

9. Method according to claim 1, in which the amount of oxygen enrichment in the special blast of oxygen-enriched air is sufficient to increase the equilibrium temperature in the column to between 1040° C. and 1060° C. under the prevailing conditions.

10. Method according to claim 1, in which the oxidic zinciferous material in the charge contains a substantial amount of oxidic lead; the oxidic lead is reduced at a temperature below the boiling point of the lead; and the resulting molten lead is separately withdrawn as such from the bottom of the blast furnace.

11. Method according to claim 1, in which the equilibrium constant K in the reversible reaction $$ZnO + CO \rightleftharpoons Zn(gas) + CO_2$$

that takes place in the equilibrium zone is $$K = (\text{percent Zn}) + \left(\frac{\text{percent } CO_2}{\text{percent } CO}\right)$$

and the constant K has a value between about 5.0 and 7.0.

References Cited

UNITED STATES PATENTS

| | | | |
|---|---|---|---|
| 1,583,933 | 5/1926 | Kirby | 75—87 |
| 1,652,184 | 12/1927 | Skogmark | 75—87 |
| 2,461,697 | 2/1949 | Queneau | 75—87 |
| 2,816,022 | 12/1957 | Morgan et al. | 75—87 |
| 2,858,205 | 10/1958 | Warland | 75—87 |

FOREIGN PATENTS 742,763  1/1956  Great Britain.

HYLAND BIZOT, *Primary Examiner.*

H. W. TARRING, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,407,060                  October 22, 1968

John Lumsden

It is certified that error appears in the above identified patent and that said Letters Patent are hereby corrected as shown below:

Column 5, line 8, "Thus" should read -- The --; line 9, "burnet" should read -- burnt --; line 62, "1950° C." should read -- 1050° C. --. Column 8, line 14, cancel "a".

Signed and sealed this 3rd day of March 1970.

(SEAL)
Attest:

Edward M. Fletcher, Jr.            WILLIAM E. SCHUYLER, JR.
Attesting Officer                   Commissioner of Patents